United States Statutory Invention Registration [19]

[11] Reg. Number: H312

Parker

[43] Published: Jul. 7, 1987

[54] ROTATING ANODE X-RAY TUBE

[76] Inventor: Todd S. Parker, 117 W. 1050 South, Bountiful, Utah 84010

[21] Appl. No.: 697,110

[22] Filed: Feb. 1, 1985

[51] Int. Cl.[4] ..... H01J 35/10

[52] U.S. Cl. ..... 378/127; 378/130; 378/141

[58] Field of Search ..... 378/127, 130, 141, 200

[56] References Cited

U.S. PATENT DOCUMENTS

| | | | |
|---|---|---|---|
| 2,258,141 | 10/1941 | Magnusson | 378/200 |
| 2,829,271 | 4/1958 | Boucher | 378/200 |
| 3,942,059 | 3/1976 | Tran-Quang | 378/130 |
| 4,165,472 | 8/1979 | Wittry | 378/130 |

*Primary Examiner*—Stephen C. Buczinski
*Assistant Examiner*—Linda J. Wallace

[57] ABSTRACT

A rotating anode X-ray generating tube having heat dissipating fins on the anode structure interleaved with heat receiving fins attached to the vacuum envelop with means for cooling the heat receiving fins, thereby allowing enhanced heat transfer from the anode structure to the outside environment. The operation of the foregoing structure may be enhanced further by judicious choice of materials.

29 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.4
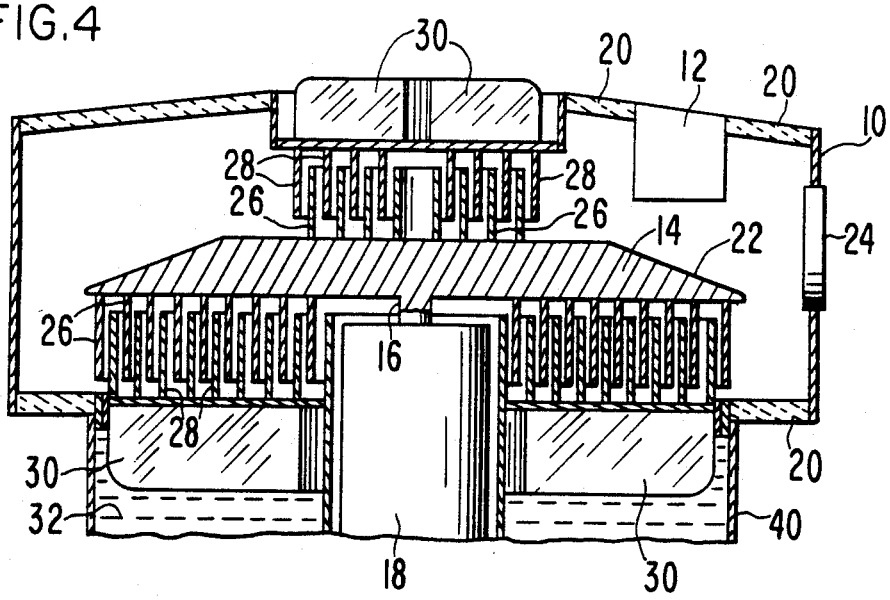
FIG.5
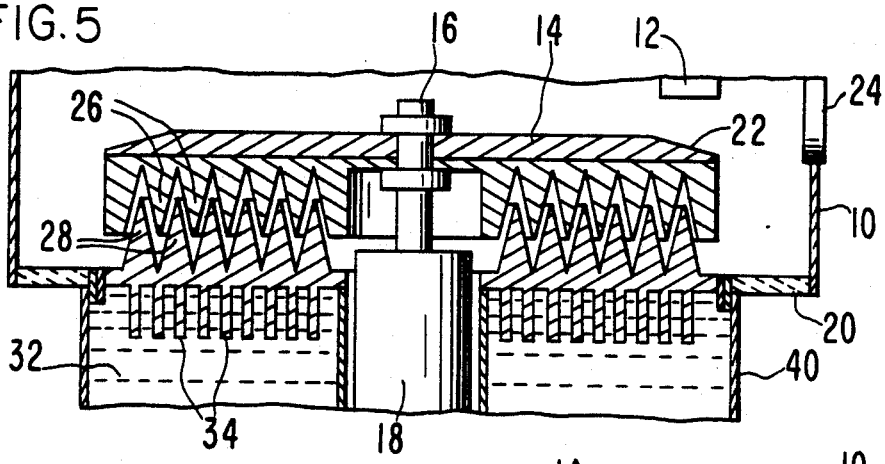
FIG.6
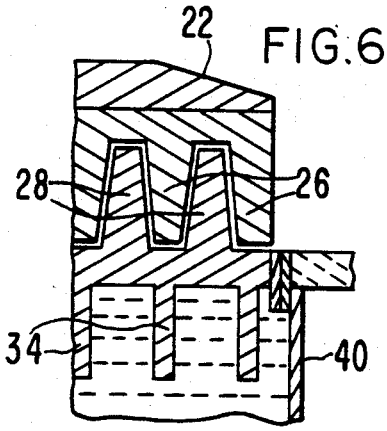
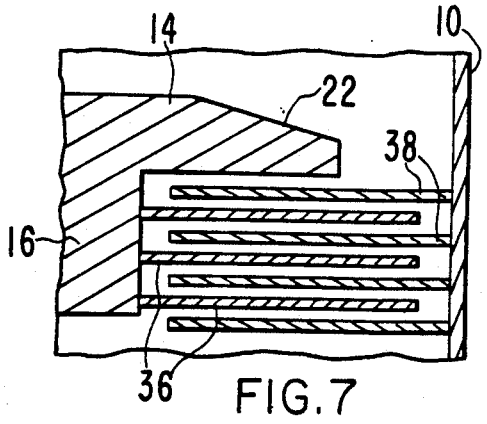
FIG.7

ROTATING ANODE X-RAY TUBE

BACKGROUND OF THE INVENTION

1. Field of the Invention

This invention relates to means for dissipating the thermal energy imparted to the anode of a rotating anode X-ray generating tube.

2. Description of the Related Art

In X-ray generating tubes a stream of electrons emitted from a cathode and accelerated to high energy strikes an anode surface to release electromagnetic energy in the form of X-rays. In many applications, it is desirable to narrowly focus the stream of electrons onto a small area of the anode. In addition, it is often desirable to maximize the energy of the electron stream in order to produce a large amount of high energy X-rays. When electrons strike the anode surface only a small fraction of their energy is converted to X-rays. Much of the energy is, instead, released as heat thereby elevating the anode temperature. The buildup of thermal energy in the anode is a limiting factor in the power output, longevity, and efficiency of X-ray generating tubes. The need for continuous use, high power X-ray tubes has become even stronger with the advent of new types of medical equipment, such as computer assisted tomography ("CAT" scanners).

The use of a rotating anode disperses the energy of the electron stream over a large area, while maintaining a narrow focal spot. Rotating anode X-ray generating tubes are now common, and the construction and operation of such is widely reported.

However, even with the rotating anode design the buildup of thermal energy in the anode structure remains a problem. Since the anode structure operates in a vacuum, heat cannot be carried away from the anode surface by convection. Some heat can be conducted to the exterior of the tube through the bearing structure of the rotating anode. However, heat buildup in the bearing structure is a major cause of tube failure. Generally, it is desireable to thermally isolate the bearing, thereby minimizing heat loss by the mode of conduction.

One approach to increasing the thermal capacity of rotating anode X-ray tubes has been to increase the radius and volume of the anode disk, thereby increasing the mass of material capable of storing the thermal energy imparted by the electron beam. However, such designs do not increase the capacity of the anode to dispose of thermal energy. Under continuous use, such designs also result in heat build-up, again posing the same problem. Moreover, this approach has the added disadvantage of amplifying the mechanical motions of the anode as it rotates and increasing the difficulty of maintaining the mechanical tolerances of the anode structure. This approach raises the overall moment of inertia of the anode, thereby necessitating greater input of rotational energy.

Another approach has been to incorporate materials with high thermal capacity and emissivity into the anode structure; see U.S. Pat. Nos. Re 31,568 and Re 31,560 for examples of such anodes. The use of graphite in the anode structure is now fairly common for these qualities. While materials can be chosen which store and dissipate heat more effectively, heat dissipation remains a problem as power levels are increased. The improvement presented by this approach does not fully meet the needs of modern high power X-ray tubes.

Still another approach has been the design of liquid cooled rotating anode tubes. Examples of inventions of this type are set forth in U.S. Pat. No. 4,405,876. Nonetheless, this approach has not enjoyed widespread commercial success in medical applications due, primarily, to the complexity of the tube design and the expense of construction and maintenance of such tubes.

Accordingly, it is an object of this invention to provide new and improved means for dissipating thermal energy from a rotating anode structure of an x-ray generating tube.

Another object of this invention is to provide simple means for limiting the buildup of thermal energy on a rotating anode structure without substantially increasing the mass of the anode or resorting to complex systems of liquid cooling of the anode.

Yet another object of this invention is to substantially increase the surface area of the anode without substantially increasing the mass or overall size.

As will be seen from the following description, the effectiveness of the anode structure described herein can be further enhanced by the proper selection of materials.

SUMMARY OF THE INVENTION

This invention teaches the use of blind fins on a rotating anode of an X-ray generating tube interleaved with stationary fins mounted on the tube envelope whereby thermal energy is dissipated by radiation from the anode fins to the stationary fins. The heat received by the stationary fins then flows to cooling means outside the vacuum envelope. The cooling means may take the form of a third set of fins immersed in a cooling fluid, such as dielectric oil. This configuration, which may be further enhanced by the proper selection of materials, significantly increases the capacity for the anode structure to dissipate heat.

BRIEF DESCRIPTION OF THE DRAWINGS

FIG. 4 is a schematic diagram comparable to FIG. 1 of an X-ray generating tube incorporating a second embodiment of the present invention.

FIG. 5 is a schematic diagram comparable to FIG. 1 of a portion of an X-ray generating tube showing another embodiment of the present invention.

FIG. 6 is a fragmentary cross sectional view of yet another embodiment of the present invention.

FIG. 7 is a fragmentary cross sectional view of still another embodiment of the present invention.

DESCRIPTION OF THE PREFERRED EMBODIMENTS

Figure 1:
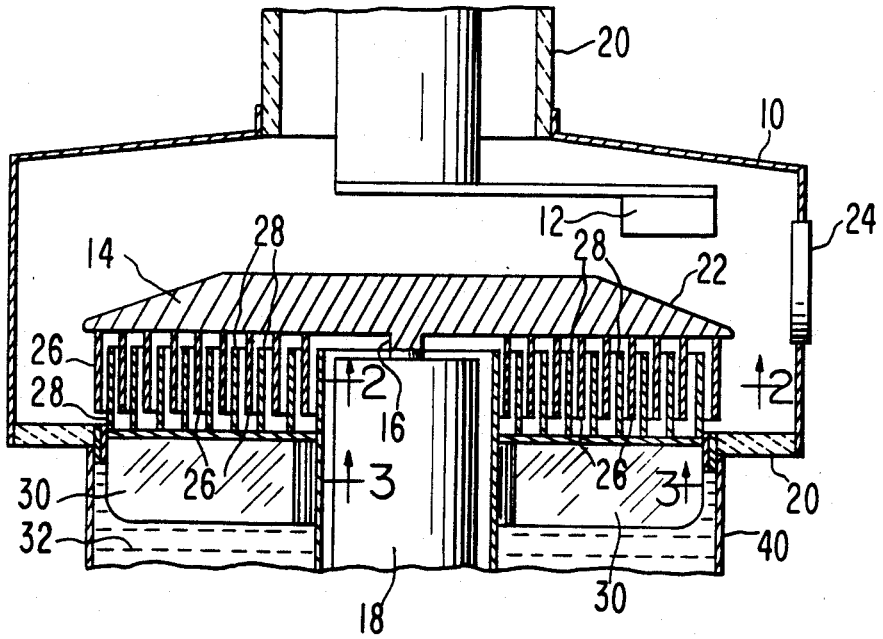
FIG. 1 is a schematic diagram of a rotating anode X-ray generating tube, shown in partial cross section along a plane parallel to the axis of rotation, and incorporating one embodiment of the present invention.

FIG. 1 schematically shows a rotating anode X-ray generating tube embodying the present invention. A vacuum envelope 10, typically of metallic construction, houses the internal structure of the tube. A cathode 12 for emitting a stream of electrons is positioned in proximity to an anode 14. The anode is rotated around a shaft 16 contained within the bearing housing 18. Rotational motion is directed to the anode from outside the vacuum envelope by bearing means within a housing 18. Such bearing means are well known in the art. The anode 14 and the cathode 12 are insulated from the metallic envelope by insulating members 20.

Electrons are released from the cathode 12 directed to the anode 14. Preferably the electrons are formed into a narrow, uniform stream by the cathode 12. The electron stream is accelerated to high energy by the voltage difference between the anode 14 and the cathode 12. The accelerated electrons strike the peripheral track 22 of the anode 14 releasing X-rays which escape through the window 24 in the vacuum envelope 10.

Only a fraction of the energy of the electron stream is converted into X-rays in this process. The bulk of the energy of the electron stream is released as thermal energy imparted to the anode surface at the point of electron impact.

Typically, the peripheral track 22 is comprised of material, such as tungsten or a rhenium tungsten alloy, which emits X-rays of the desired energy when excited and which is capable of withstanding the deleterious effects of bombardment by high energy electrons. This track may be a thin layer of such material joined to the body of the anode 14. The anode body is typically comprised of a material, such as graphite or molybdenum alloy, with high heat capacity and good high temperature operating properties.

The rotation of the anode 14 has the effect of dispersing the imparted thermal energy over a much larger portion of the surface of the peripheral track 22 than would occur if the anode were stationary. Nonetheless, the peripheral track 22 absorbs a large amount of thermal energy which is conducted to the body of the anode 14. Whenever the tube is in continuous use, the anode tends toward overall thermal equilibrium at a constant, elevated temperature.

It should be noted that the anode surface cannot lose heat to its surroundings by convection since it is maintained in a vacuum. Thus, the absorbed heat can be dissipated in only two ways. It can travel by conduction through the bearing structure 18 to the exterior of the envelope. Note that this mode of heat dissipation is deleterious to the bearings and is a major source of tube failure. In view of this, some tube designs attempt to thermally isolate the periphery of the anode from the bearing structure, further limiting the anode's ability to dissipate heat in this manner.

The second possible mode of heat dissipation from the anode is by radiation from the anode surface. The amount of heat that can be radiated is a function of the surface area of the anode, the temperature difference between the anode and the surrounding structure, the amount of the anode surface which is "viewed" by the surrounding structure, and the emissivities of the viewing surfaces.

As the temperature at the anode increases, the rate of heat dissipation by radiation and, to a lesser extent, conduction through the bearings, increases until thermal equilibrium is achieved at an elevated temperature. The temperature of equilibrium is a function of the power of the electron stream for a given tube configuration. Thus, the temperature limitations of the anode materials and particularly of the bearings limits the power capabilities of the tube.

Figure 2:
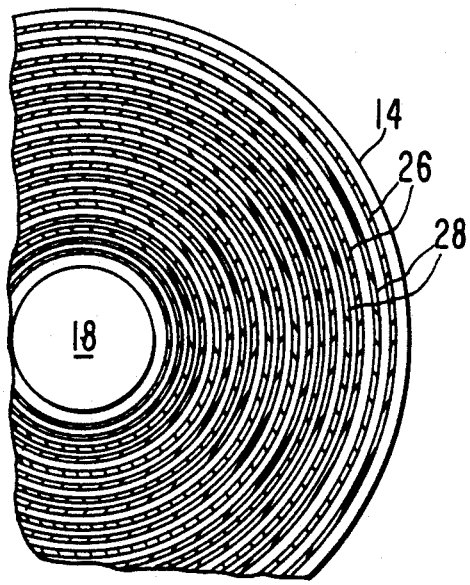
FIG. 2 is a view of a portion of FIG. 1 along view lines 2—2 showing annular fins projecting from the bottom of the anode disk.

The present invention seeks to increase the power capability of X-ray generating tubes by significantly enhancing the capacity of the anode to dissipate thermal energy by radiation. In a preferred embodiment of the invention, as shown in FIG. 1, the anode 14 has a set of annular fins 26. FIG. 2 is another view of the annular fins 26. The embodiments of FIGS. 1 and 2 show these fins having cross section of elongated rectangles. However, the cross section of the fins can also be triangular as shown in FIG. 5 or trapezoidal as shown in FIG. 6.

Interleaved with the anode fins 26 are stationary fins 28 mounted on the vacuum envelope. The shape of these stationary fins 28 corresponds to the shape of the annular fins 26 as is shown in FIGS. 1, 5 and 6.

Different fin geometries have different advantages and disadvantages. Selection of the optimal geometry depends on the size and geometry of the rest of the tube and on the selection of fin materials. Moreover, construction costs affect the choice of geometry. For example, elongated rectangles can be easily constructed to have the narrowest base of the embodiments shown. This permits the largest number of fins to be mounted on the anode and therebY, the greatest increase in surface area. On the other hand, fins having a thick base permit better heat conduction along the length of the fin. Triangular fins and trapezoidal fins represent compromise approaches between these factors, but are more expensive to produce.

As is shown, the anode fins 26 greatly increase the surface area from which heat from the anode may be dissipated by radiation. The anode fins may be constructed of a material, such as graphite, which is known to have high thermal emissivity and good high temperature operating properties. They may alternatively be of a material, such as molybdenum alloy which has high thermal conductivity but a low emissivity, and then coated with a high emissivity layer.

The interleaved stationary fins greatly increase the surface area which "views" the anode surface, thereby increasing the surface area for receiving the emitted thermal radiation. Ideally, the anode fins should be entirely "blind." That is, when observing from anywhere on the surface of any anode fin one should be unable to "view" the neighboring anode fin due to the presence of an intervening stationary fin. Conversely, the stationary fins should also be "blind". The ability of the anode fins to transfer energy to the receiving fins is further enhanced by orienting the interleaved fins so that their surfaces are parallel and closely spaced as shown is in FIGS. 1, 4, 5 and 6.

The rate of radiative heat transfer corresponds to the difference in temperature between the anode fins and the interleaved stationary fins. Accordingly, the stationary fins are maintained at a low temperature by providing means for transmitting the heat received by the stationary fins to the exterior of the vacuum envelope where it can be disposed. In the preferred embodiment, disposal of the heat is accomplished by a set of exterior fins 30 in contact with a fluid maintained at a temperature substantially lower than the operating temperature of the anode. Such exterior fins may be immersed in a dielectric fluid 32 such as oil, retained within a second envelope 40. The dielectric fluid 32 may be circulated and/or cooled by conventional means to enhance the disposal of heat from the exterior fins 30. To facilitate the transmission of thermal energy from the stationary fins 28 to the exterior fins 30, the two sets of fins should be of unitary construction and made from a material, such as copper, with high thermal conductivity.

Figure 3:
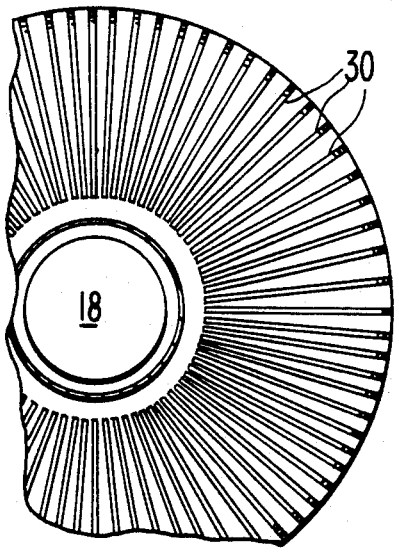
FIG. 3 is a view of a portion of FIG. 1 along view lines 3—3 showing exterior radial fins projecting outside the vacuum envelope.

FIGS. 1, 3 and 4 show exterior fins 30 forming planar surfaces radially oriented with respect to the axis of rotation of the anode. FIG. 3 is a view of such radial fins perpendicular to the bottom of the vacuum envelope. FIGS. 5 and 6 show exterior fins 34 which are straight and parallel to each other. Alternatively, the exterior fins 30 can be annular (not shown). Other convective cooling schemes are available and may be employed depending on exterior design constraints.

An alternative embodiment of the present invention is shown in FIG. 4. The embodiment has a second set of anode fins 26 projecting from the upper surface of the anode disk 14 and positioned radially inward from the peripheral track 22. Interleaved with these upper anode fins is a second set of stationary fins 28 attached to the vacuum envelope 10. This second set of interleaved blind fins acts in the same manner as the first set of interleaved blind fins as described above. FIG. 4 also shows a second set of exterior fins 30 mounted atop the tube. This second set of exterior fins 30 is shown in contact with the atmosphere. Alternatively, this second set of exterior fins may dispose of heat through a dielectric fluid as described above with respect to the first set of exterior fins.

Yet another embodiment of the present invention is shown in FIG. 7. In this embodiment, the anode fins 36 and the stationary fins 38 comprise interleaved blind disks coaxial with the anode disk 22 and in planes perpendicular to its axis of rotation.

The improvements described permit more efficient disposal of the thermal energy imparted to the anode of a rotating anode X-ray generating tube. This allows the design of tubes capable of handling a higher power for greater periods of time, as is required by new radiological apparatus and techniques. Moreover, the improved design does not resort to complex and unreliable liquid cooling means which have not been successfully adapted to medical applications, nor does it rely on substantially increasing the anode radius.

What is claimed is:

1. An X-ray generating tube, comprising:

(a) a vacuum envelope;

(b) an anode, within said envelope, adapted for rotation about an axis and including a peripheral track and a first set of fins for radiating thermal energy;

(c) cathode means within said envelope, for generating a beam of electrons to strike said peripheral track with sufficient energy to generate X-rays;

(d) a window allowing transmission of said X-rays outside the tube; and (e) a second set of fins, mounted on the inside of said vacuum envelope, and in thermal contact with the exterior of the tube, said second set of fins being interleaved with said first set of fins.

2. An X-ray generating tube, as in claim 1, further comprising means for cooling said second set of fins.

3. An X-ray generating tube, as in claim 1, further comprising a third set of fins mounted exteriorly of said envelope and in thermal communication with said second set of fins for releasing thermal energy outside said envelope.

4. An X-ray generating tube, as in claim 3, further comprising means for cooling said third set of fins.

5. An X-ray generating tube, as in claim 1, wherein said first and second sets of interleaved fins are annular with respect to the axis of rotation of said anode.

6. An X-ray generating tube, as in claim 5, wherein said annular fins are of rectangular cross section.

7. An X-ray generating tube, as in claim 5, wherein said annular fins are of triangular cross section.

8. An X-ray generating tube, as in claim 5, wherein said annular fins are of trapezoidal cross section.

9. An X-ray generating tube, as in claim 1, wherein said first and second sets of fins are disk-shaped and extend in planes coaxial with said anode.

10. An X-ray generating tube, as in claim 3, wherein said third set of fins extend in planes oriented radially with respect to the axis of rotation of said anode.

11. An X-ray generating tube, as in claim 3, wherein each of said third set of fins is straight and parallel to the other of said fins.

12. An X-ray generating tube, as in claim 3, wherein said third set of fins are annular with respect to the axis of rotation of said anode.

13. An X-ray generating tube, as in claim 3, wherein said rotating anode is disk-shaped having first and second opposite faces; said peripheral track being positioned on said first anode face and said first set of fins projecting from said second anode face.

14. An X-ray generating tube, as in claim 13, further comprising:

(a) a fourth set of fins projecting from said first anode surface and positioned radially inward from said periphral track; and (b) a fifth set of fins, mounted on said vacuum envelope, said fifth set of fins interleaving with said fourth set of fins, and in thermal communication with the exterior of said envelope.

15. An X-ray generating tube, as in claim 14, further comprising a sixth set of fins in thermal contact with said fifth set of fins; said sixth set of fins being positioned outside the vacuum envelope, for releasing thermal energy.

16. An X-ray generating tube, as in claim 14, wherein said fourth and fifth sets of fins are annular with respect to said axis of rotation of said anode.

17. An X-ray generating tube, as in claim 16, wherein said annular fins are of rectangular cross section.

18. An X-ray generating tube, as in claim 16, wherein said annular fins are of triangular cross section.

19. An X-ray generating tube, as in claim 16, wherein said annular fins are of a trapezoidal cross section.

20. An X-ray generating tube, as in claim 15, wherein said sixth set of fins extend in planes oriented radially with respect to the axis of rotation of said anode.

21. An X-ray generating tube, as in claim 15, wherein each of said sixth set of fins is straight and parallel to the other of said fins.

22. An X-ray generating tube, as in claim 15, wherein said sixth set of fins are annular.

23. An X-ray generating tube, as in claim 15, further comprising means for cooling said sixth set of fins.

24. An X-ray generating tube, as in claim 1, wherein said first set of fins comprises material of high thermal emissivity.

25. An X-ray generating tube, as in claim 3, wherein said second and third sets of fins are of unitary construction and comprise material of high thermal conductivity.

26. An X-ray generating tube, comprising:

(a) a vacuum envelope;

(b) a disk-shaped anode adapted for rotation about an axis comprising:

(1) first and second opposite faces, (2) a peripheral track mounted on said first face, (3) a first set of annular fins projecting from said second face for radiating thermal energy accumulated by said anode;

(c) cathode means for generating a beam of electrons to strike said peripheral track with sufficient energy to produce X-rays;

(d) a window in said envelope allowing said X-rays to be transmitted exteriorly thereof;

(e) a second set of annular fins, mounted inside said envelope, interleaved with said first set of fins, for receiving thermal energy radiated from said first set of fins; and (f) means for cooling said second set of fins.

27. An X-ray generating tube, as in claim 26, wherein the means for cooling said second set of fins comprises a third set of fins, thermally connected to said second set of fins by material of high thermal conductivity, said third set of fins projecting outside said vacuum envelope into a fluid maintained substantially cooler than the operating temperature of said anode.

28. An X-ray generating tube, as in claim 27, wherein said fluid is a dielectric liquid of high heat capacity which is circulated to enhance the transfer of thermal energy from said set of fins to said liquid.

29. An X-ray generating tube, as in claim 26, wherein said first and second sets of fins comprise material which enhances the radiative transfer of thermal energy therebetween.

* * * * *